United States Patent
Hoffman et al.

(10) Patent No.: US 12,284,089 B2
(45) Date of Patent: Apr. 22, 2025

(54) ALERT CORRELATING USING SEQUENCE MODEL WITH TOPOLOGY REINFORCEMENT SYSTEMS AND METHODS

(71) Applicant: OPSRAMP, INC., San Jose, CA (US)

(72) Inventors: Jiayi Gu Hoffman, Sunnyvale, CA (US); Mahesh Ramachandran, San Jose, CA (US); Bhanu Pratap Singh, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 16 days.

(21) Appl. No.: 17/822,157

(22) Filed: Aug. 25, 2022

(65) Prior Publication Data

US 2023/0133541 A1     May 4, 2023

Related U.S. Application Data

(63) Continuation of application No. 16/876,723, filed on May 18, 2020, now abandoned.

(Continued)

(51) Int. Cl.
| | |
|---|---|
| G06F 7/76 | (2006.01) |
| G06F 9/54 | (2006.01) |
| G06F 18/22 | (2023.01) |
| G06F 18/23 | (2023.01) |
| G06N 3/08 | (2023.01) |
| H04L 41/0631 | (2022.01) |
| H04L 41/16 | (2022.01) |

(52) U.S. Cl.
CPC .............. *H04L 41/16* (2013.01); *G06F 9/542* (2013.01); *G06F 9/544* (2013.01); *G06F 18/22* (2023.01); *G06F 18/23* (2023.01); *G06N 3/08* (2013.01); *H04L 41/0631* (2013.01)

(58) Field of Classification Search
CPC ..... H04L 41/16; H04L 41/0631; G06F 9/542; G06F 9/544; G06F 18/22; G06F 18/23; G06N 3/08
See application file for complete search history.

(56) References Cited

U.S. PATENT DOCUMENTS

| | | | |
|---|---|---|---|
| 8,667,340 B2 * | 3/2014 | Stepanenko | G06F 11/0784 |
| | | | 714/57 |
| 9,317,829 B2 | 4/2016 | Anand et al. | |
| (Continued) | | | |

OTHER PUBLICATIONS

Baoyi Wang et al. ("A Distributed Intrusion Detect Model Based on Alert Data Correlation Analysis", (Year: 2010).*

(Continued)

*Primary Examiner* — Kevin L Young
*Assistant Examiner* — Abdou K Seye
(74) *Attorney, Agent, or Firm* — Trop, Pruner & Hu, P.C.

(57) ABSTRACT

Alert correlation helps reduce the number of alerts that IT staff have to act upon. Methods include a computer program product that applies a machine driven deep learning model to effectively correlate alerts caused by a common root cause. The methods of correlation provide the user the context of the root cause for the alerts. Therefore, it helps the user to quickly identify, understand and resolve the problem thereby reducing the mean time to identification and resolution. Alerts caused by the same root cause therefor come together.

23 Claims, 5 Drawing Sheets

Related U.S. Application Data

(60) Provisional application No. 62/968,399, filed on Jan. 31, 2020.

(56) References Cited

U.S. PATENT DOCUMENTS

| | | | |
|---|---|---|---|
| 10,353,902 | B2 | 7/2019 | Obinata et al. |
| 10,380,600 | B2 | 8/2019 | Bedoun et al. |
| 10,459,951 | B2 | 10/2019 | Venkataraman et al. |
| 10,560,309 | B1* | 2/2020 | Chitalia ............... H04L 41/40 |
| 10,937,444 | B1* | 3/2021 | Suendermann-Oeft ..................... G06N 3/045 |
| 2007/0208698 | A1 | 9/2007 | Brindley et al. |
| 2014/0149568 | A1 | 5/2014 | Kruempelmann et al. |
| 2015/0172096 | A1 | 6/2015 | Sadovsky et al. |
| 2017/0353991 | A1 | 12/2017 | Tapia |
| 2017/0359215 | A1* | 12/2017 | Movsisyan ........... H04L 41/069 |
| 2018/0039529 | A1 | 2/2018 | Lehmann et al. |
| 2018/0239752 | A1 | 8/2018 | Bhattacharya |
| 2018/0307551 | A1 | 10/2018 | Bacha |
| 2019/0114244 | A1 | 4/2019 | Salunke et al. |
| 2019/0132191 | A1 | 5/2019 | Mann et al. |
| 2019/0318295 | A1 | 10/2019 | Srivastava et al. |
| 2019/0332932 | A1* | 10/2019 | Sivaraman ............. G06N 3/048 |
| 2021/0056430 | A1* | 2/2021 | Wu ........................ G06N 3/006 |
| 2021/0243069 | A1 | 8/2021 | Hoffman et al. |

OTHER PUBLICATIONS

Ke Zhang "Automated IT System Failure Prediction: A Deep Learning Approach" (Year: 2016).*

Shaoyu Dou et al. "PC2A: Predicting Collective Contextual Anomalies via LSTM With Deep Generative Model", (Year: 2019).*

Next Generation AI root-cause analysis (Nov. 13, 2013).

Fighel, AI and Machine Learning Powered Correlations for Prometheus, accessed from https://blog.signifai.io/alert-correlation-prometheus/ (Jun. 14, 2018).

Wang et al., A Distributed Intrusion Detect Model Based on Alert Data Correlation Analysis, 2010 Int'l Conf on Comp Appln Sys Modeling, V3-669-673 (2010).

Wang et al., Adaptive Feature-Weighted Alert Correlation System Applicable in Cloud Environment, 2013 Eighth Asia Jt. Conf on Info Sec. pp. 41-47 (2013).

* cited by examiner

ALERT CORRELATING USING SEQUENCE MODEL WITH TOPOLOGY REINFORCEMENT SYSTEMS AND METHODS

CROSS-REFERENCE

This application is a continuation of U.S. application Ser. No. 16/876,723 filed Aug. 5, 2021, which claims the benefit of U.S. Provisional Application No. 62/968,399, filed Jan. 31, 2020, entitled ALERT CORRELATING USING SEQUENCE MODEL WITH TOPOLOGY REINFORCEMENT SYSTEMS AND METHODS which applications are incorporated herein in their entirety by reference.

BACKGROUND

In a complex and distributed hybrid cloud IT environment, a system element failure or an application down (e.g., application is not operating normally or available) can have a ripple effect causing multiple systems and applications to behave abnormally, impacting a community of users/customers. In response to a system element failure or application down situation many alerts are triggered which causes chaos in the IT environment. The resulting chaos consumes resources which results in cost to the organization and negatively impacts customer experience. Clustering related alerts, and quickly identifying a root-cause, or causes, is important for business continuity and operational stability. However, clustering alerts is time consuming and challenging due to the complexity of the hybrid cloud environment.

The traditional clustering approach requires tedious manual configuration, and is often not effective in the changing dynamic software environment that operates on ephemeral infrastructure. Additionally, manual clustering cannot automatically adjust and scale to the changing environment of the business.

What is needed is a simple and effective way to quickly and accurately cluster related alerts and provide users with the context of the root cause of the alerts.

SUMMARY

Disclosed is a simple and effective way to quickly, accurately, and automatically cluster alerts to provide users with the context of the root cause of the alerts.

Also disclosed is a method of analyzing one or more alerts in a computing environment to determine a probable root cause for the one or more alerts. The method can include a deep learning model trained to generate a sequence of alerts, a topology that discovers connections among one or more infrastructures and/or one or more software applications in a computing environment, such as an IT environment. Additionally, a processing mechanism can be provided to receive and normalize one or more alerts created by one or more sources from one or more cloud computing environments. A deep learning model can be applied to the alert system to identify alerts that are in proximity or clustered, using topology to remove alerts whose resources are not connected to other alert resources, and/or correlating alerts that have the same root cause.

In the machine learning world, language sequence models are doing very well on learning the sequence patterns between words. For example, the machine can learn the subtle difference between choice of words and the order of words in order to fake a person's writing. The disclosed embodiments use similar technology applied to IT monitoring alerts for hybrid cloud environments to learn the sequence pattern for the alerts.

Besides correlating using time sequence, this approach also reinforces the correlation using topology. The correlated alerts are configurable to appear together in time, and can be connected in space. The correlated alerts provide the end user insight into the root cause of the alerts.

Alerts correlated using this embodiment are often caused by the same root cause and may be treated as one unit of work to help the user understand the context and therefore reduce the time of resolution.

An aspect of the disclosure is directed to a method of correlating a plurality of alerts in a network environment including multiple computing devices coupled through one or more networks. Suitable methods comprise: receiving a plurality of alerts from one or more applications operating in the network environment; analyzing the plurality of alerts in a time sequence; correlating the plurality of alerts via an alert correlation module comprising one or more of a sequence model, a topology reinforcement module, and a similarity reinforcement module; clustering the plurality of alerts attributable to a common triggering event. The methods can further comprise: converting one or more raw alerts into one or more normalized alerts for analysis. Raw alerts can be normalized for analysis and provided to a data pipeline. Additionally, the sequence model is trainable using historical alert sequences on a neural network. The topology reinforcement can be created through a network discovery. The similarity reinforcement can also be based on a natural language process. A first alert in an alert sequence can also be used to invoke a sequence model. Methods can further include alert sequence training of a neural network. Additional steps of the method can include taking information from an input alert at a first timestep; calculating an alert sequence; and predicting a time interval for which a simulation will progress. Additionally, the method can include one or more of alert embedding, and running a training workload as a scheduled batch job on a training node. The plurality of alerts are not analyzed individually or in alert pairs.

Another aspect of the disclosure is directed to one or more computer-readable storage media storing computer-executable instructions for causing a computer to perform a method comprising: receiving a plurality of alerts from one or more applications operating in a network environment; analyzing the plurality of alerts in a time sequence; correlating the plurality of alerts via an alert correlation module comprising one or more of a sequence model, a topology reinforcement module, and a similarity reinforcement module; clustering the plurality of alerts attributable to a common triggering event. Additionally the methods can comprise: converting one or more raw alerts into one or more normalized alerts for analysis. The raw alerts can be normalized for analysis and provided to a data pipeline. The sequence model can also be trainable using historical alert sequences on a neural network. Additionally, the topology reinforcement can be created through a network discovery. The similarity reinforcement can also be based on a natural language process. A first alert in an alert sequence can be training of a neural network. The instructions can further comprise: taking information from an input alert at a first timestep; calculating an alert sequence; and predicting a time interval for which a simulation will progress. The instructions can further comprise one or more of alert embedding, running a training workload as a scheduled batch job on a training node. The alerts are not analyzed individually or in alert pairs.

Still another aspect of the disclosure is directed to a system for correlating alerts in a computing environment including multiple computing devices coupled through one or more networks. The systems can further comprise: an alert processing service comprising an alert correlation module having one or more of a sequence model, topology reinforcement module, and similarity reinforcement module; and an alert normalization engine. The system can be configurable to convert one or more raw alerts received by the alert processing service into one or more normalized alerts for analysis. Additionally, the sequence model is trainable using historical alert sequences on a neural network. The topology reinforcement can also be created through a network discovery.

The disclosed systems, can comprising at least one processor; and at least one non-transitory computer readable medium storing instructions translatable by the at least one processor to perform the methods and/or steps described herein. Additionally, the disclosure includes one or more computer program products comprising at least one non-transitory computer readable medium storing instructions translatable by at least one processor to perform the methods and/or steps described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.
U.S. Pat. No. 9,317,829 B2 published Apr. 19, 2016, for DIAGNOSING INCIDENTS FOR INFORMATION TECHNOLOGY SERVICE MANAGEMENT;
U.S. Pat. No. 10,353,902 B2 published Jul. 16, 2019, for NON-TRANSITORY COMPUTER-READABLE RECORDING MEDIUM, RETRIEVAL SUPPORT DEVICE, AND RETRIEVAL SUPPORT METHOD;
U.S. Pat. No. 10,380,600 B2 published Aug. 13, 2019, for PROGRAM IDENTIFIER RESPONSE TO UNSTRUCTURED INPUT;
U.S. Pat. No. 10,459,951 B2 published Oct. 29, 2019, for METHOD AND SYSTEM FOR DETERMINING AUTOMATION SEQUENCES FOR RESOLUTION OF AN INCIDENT TICKET;
US 2015/0172096 A1, published Jun. 18, 2015, for SYSTEM ALERT CORRELATION VIA DELTAS;
US 2017/0353991 A1 published Dec. 7, 2017, for ARTIFICIAL INTELLIGENCE-BASED NETWORK ADVISOR;
US 2018/0039529 A1 published Feb. 8, 2018, for DETERMINING ROOT-CAUSE OF FAILURES BASED ON MACHINE-GENERATED TEXTUAL DATA;
US 2018/0239752 A1 published Aug. 24, 2018, for CORRELATING DISTINCT EVENTS USING LINGUISTIC ANALYSIS;
US 2018/0307551 A1 published Oct. 25, 2018, for LOG EVENTS FOR ROOT CAUSE ERROR DIAGNOSIS;
US 2019/0132191 A1 published May 2, 2019, for MACHINE-LEARNING AND DEEP-LEARNING TECHNIQUES FOR PREDICTIVE TICKETING IN INFORMATION TECHNOLOGY SYSTEMS; and
US 2019/0318295 A1 published Oct. 17, 2019, for AUTOMATED TICKET RESOLUTION.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
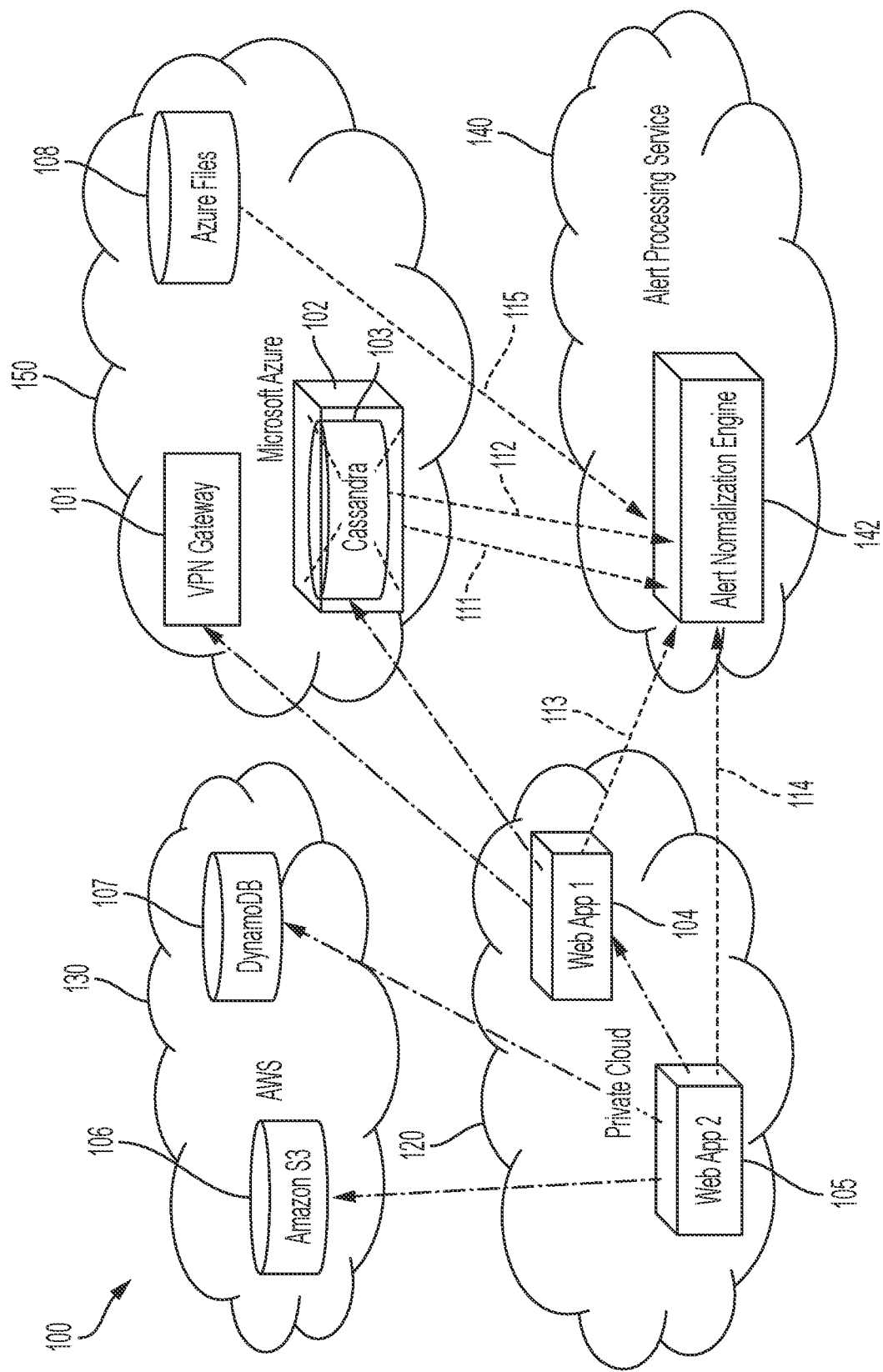
FIG. 1 illustrates an example hybrid environment, where alerts are generated from many different sources; alerts may be correlated according to the disclosure.

FIG. 1 illustrates an example hybrid computing environment where alerts are created by different monitors and from different clouds in an IT environment. Alerts may be analyzed in a centralized service for correlation and clustering using sequence and topology reinforcement according to the disclosure. A first public cloud environment 150 is, for example, a Microsoft Azure public cloud which includes a plurality of network devices, for example, a VPN gateway 101, a server 102 with a software application 103, a database of files 108 (such as Azure files). The components in the first public cloud environment 150, are in communication with, for example, a private cloud 120 which hosts a first service 104, and a second service 105. The private cloud 120, is in communication with another public cloud 130, such as Amazon Web Service ("AWS"), which hosts a storage service 106, such as Amazon S3 simple cloud storage service, and a document database 107, such as the DynamoDB available from Amazon. An alert processing service 140 is in communication directly or indirectly with one or more of the components in the first public cloud environment 150, the private cloud 120, and a second public cloud 130, and their components. The alert processing service 140 has an alert normalization engine 142. As will be appreciated by those skilled in the art, the hybrid computing environment illustrated in FIG. 1 is presented by way of example. The alert processing system disclosed can be used in a variety of a hybrid computing environment with different configurations without departing from the scope of the disclosure.

As shown, the computing environment 100 can have a distributed service 104 (web app 1) which may depend on another software application 103, server 102, and a VPN gateway 101. The distributed service 104 may provide functionalities to another service 105, such as web app 2. As will be appreciated by those skilled in the art, everything in the environment 100 can be interconnectable. Therefore, a failure at one location in the computing environment 100 can affect a plurality of components downstream from the failure location.

The flows between service 105 and storage service 106, service 105 and document database 107, and service 105 and service 104 illustrate the interdependent nature of the IT environment. Service 105 is a web application. It depends on service 106 and document database 107 for data persistence. Service 105 consumes services provided by service 104.

For example, as illustrated in FIG. 1, if server 102 has a failure or performance event (e.g., ceases to operate properly as indicated by the "X"), the software application 103, for example Apache® Cassandra®, running on the server 102 is interrupted. This interruption in turn affects the availability of service 104 (web app 1), and service 105 (web app 2) which are in communication with the server 102 and software application 103. Once the service availability is impacted a plurality of alerts, such as four alerts 111, 112, 113, 114, are then be created by different sources within the environment 100 from different clouds for the same event.

In this scenario, each of the four alerts 111, 112, 113, 114 are tied to the same root cause, which is a failure or performance event on server 102. Using the disclosed alert processing service 140, the four alerts 111, 112, 113, 114 are communicated to an alert normalization engine 142 for processing. As will be appreciated by those skilled in the art, with a high number of devices and applications operating in an environment 100, and various types of IT resources, operation monitoring is highly complex and noisy. For example, an unrelated alert, alert x 115, i.e., unrelated to the four alerts 111, 112, 113, 114, may be created around the same time as the four alerts 111, 112, 113, 114 for application 108 and communicated to the alert normalization engine 142. Correlating alerts in such an environment using traditional similarity based approaches is difficult because alerts are highly dynamic.

In a centralized alert processing service 140 according to the disclosure, two or more alerts are collected from various sources, and analyzed together in time sequence. However, alerts are not analyzed individually or in alert pairs. As noted above, when an alert triggering event occurs a single triggering event can trigger a chain reaction which results in a plurality of alerts for the same triggering event from different locations within the environment 100. Alerts in the operation resulting from the same triggering event have sequence patterns. Analyzing alerts using a deep learning sequence model identifies alerts that occur together (e.g., clustered), such as alerts 111, 112, 113, 114. Analyzing and clustering alerts provides the user the context of the root cause for the alerts, and provides clarity to determine the impacted services and resources. The analyzed alerts help the user understand the nature of the triggering event better, allowing faster response and a reduction of the time to resolution of the problem.

Figure 2:
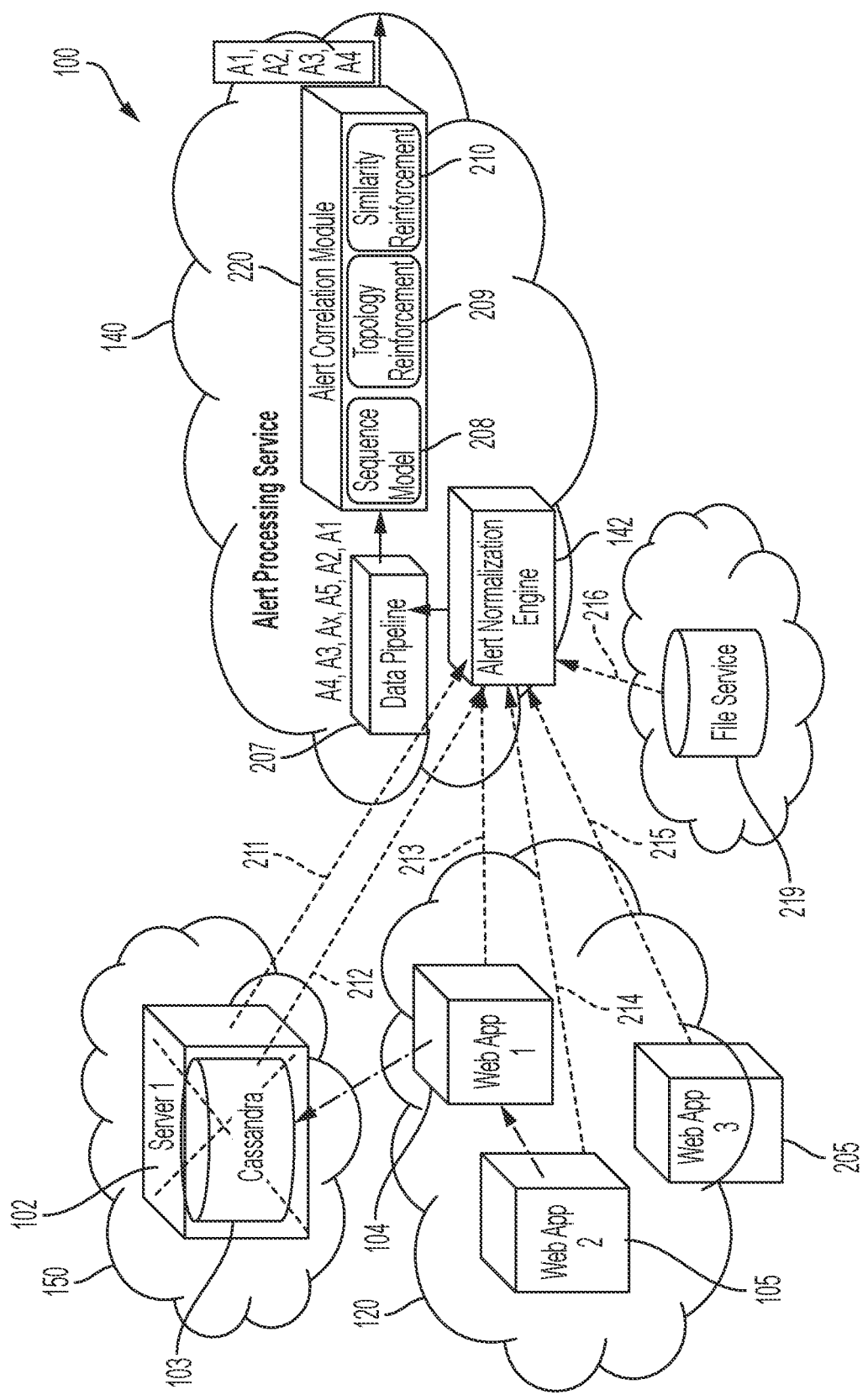
FIG. 2 illustrates the concept of correlating alerts based on the alert sequences and topology according to the disclosure.

FIG. 2 illustrates alert correlation according to the disclosure. A plurality of alerts are received by the centralized alert processing engine 142. The plurality of alerts are transmitted vial server 1 102 in a first public cloud environment 150, web applications on a private cloud 120 and file service 219. In this example, first alert (A1) 211 is a system ping alert, second alert (A2) 212 is a Cassandra Server Down alert, third alert (A3) 213 is a Web APP failed alert, fourth alert (A4) 214 is a Web APP impacted alert from service 205, and fifth alert (A5) 215 is also a Web APP impacted alert. However, only alerts 211, 212, 213, 214 are related, and should be correlated. Both the fifth alert (A5) 215 and alert x (Ax) 216 are random alerts and generated around the same time.

The correlation process correlates related alerts by the following method:
The alert normalization engine 142 converts a plurality of raw alerts received from a plurality of sources in the environment 100 into normalized alerts for the subsequent alert analysis;
The normalized alerts are provided to a data pipeline 207;
The alert stream is turned into sequences using time gaps and provided to the alert correlation module 220.

For example, alerts that occur in time over a defined interval, e.g., more than 2 minutes apart, belong to a different sequence.

The alert correlation module 220 has three parts:
a sequence model 208 that is trained using historical alert sequences on a recurrent neural network;
a topology reinforcement 209 created through network discovery; and
a similarity reinforcement 210 based on natural language processing ("NLP") technology.

The first alert 211 in an alert sequence is used to invoke the sequence model 208 to generate alert sequences. The sequence model 208 can map a fixed-length input with a fixed-length output where the length of the input and output may differ. Because the sequence of alerts 211, 212, 213, 214 has been seen multiple times before, the sequence model 208 generates alerts 212, 213, 214. Alert 216 is a random alert, so alert 216 would not be included in the generated sequence. Therefore, alert 216 is ruled out immediately. Alert 215 has the same type of Web App impacted alert as alert 214, so alert 215 is kept as a candidate for clustering at the moment, and is moved to the next phase along with other alerts attributed to the same root cause.

According to the embodiment, the alert correlation module 220 has:
a sequence model 208,
a topology reinforcement 209, and
a similarity reinforcement 210 module.

Topology reinforcement 209 receives data from a sequence model 208 and performs the next phase of processing the plurality of alerts received. According to alert correlation module, alerts 211, 212, 213, 214 are connected to each other. Therefore, using topology reinforcement 209, alert 215 is ruled out from the correlation of the other alerts. The final correlated alerts 211, 212, 213, 214 are attributed to the same root cause.

Figure 3:
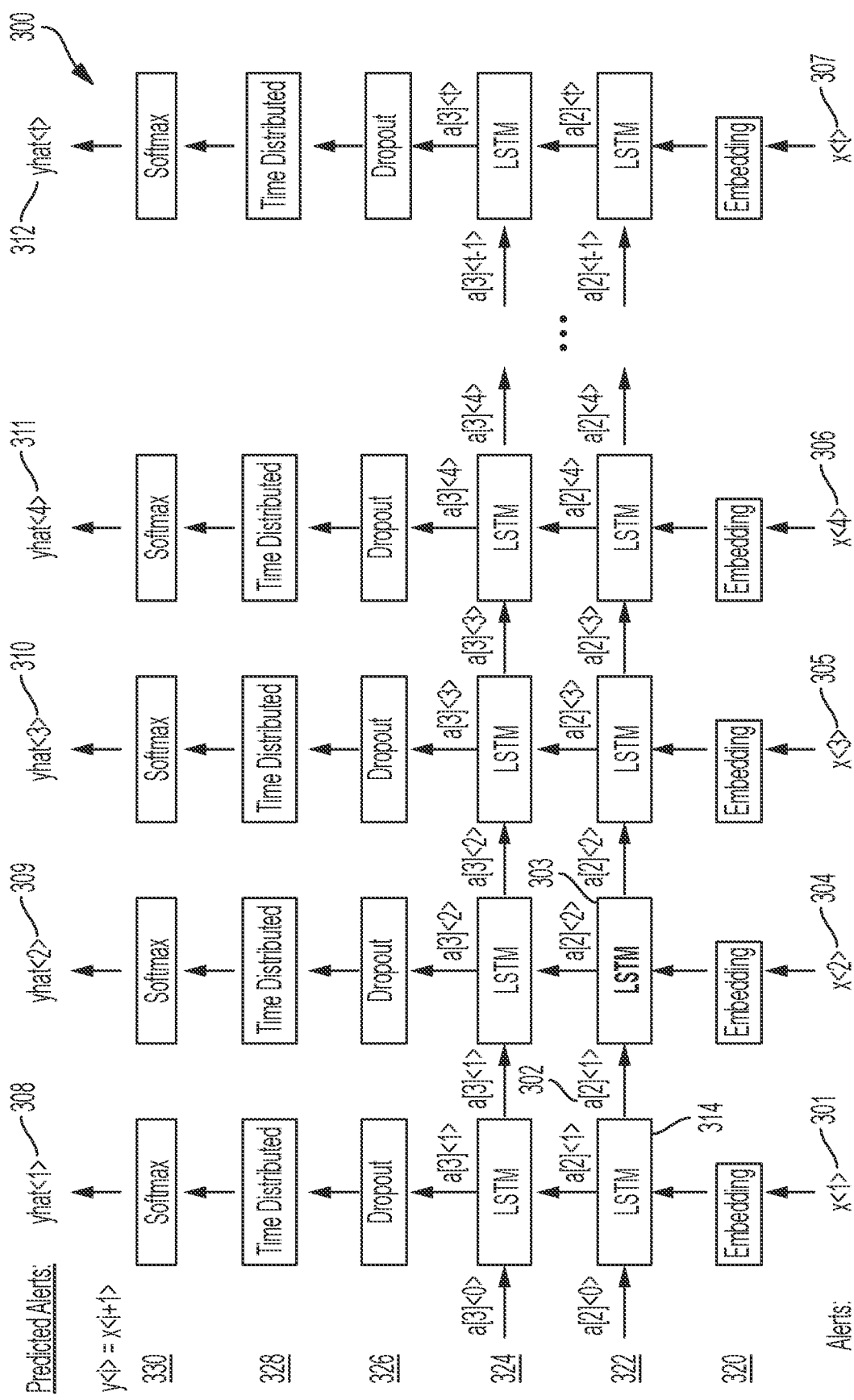
FIG. 3 illustrates the recurrent neural network ("RNN") for alert sequence training according to the disclosure.

FIG. 3 illustrates the neural network 300 for alert sequence training according to the disclosure. The neural network 300 is a long short-term memory ("LSTM") recurrent neural network ("RNN") of many-to-many architecture. The RNN has six hidden layers. The first layer is an embedding layer 320. After the embedding layer 320 are two layers of LSTM, a first LSTM layer 322, and a second LSTM layer 324, and a dropout layer 326 for regularization. Following the dropout layer 326 is a time distributed layer 328 that produces a many-to-many architecture. The last layer has a softmax function 330 that calculates the probabilities distribution of over n different values. The RNN is very effective on sequence tasks. Alert sequence generation that is performed in this embodiment is a type of sequence task. RNN has a memory cell that can read input alerts 301, 304, 305, 306, 307 one at a time, and remember some information through the hidden layers. The RNN memory cell then passes the information, e.g. a [2]<1> 302, from the current timestep 314 to the next timestep 303.

This allows a unidirectional RNN to take information from the input alert 301 at a first timestep to predict the time interval for which the simulation will progress, e.g., the value of the future timesteps 309, 310, 311, 312. The alert sequence generation is a supervised learning where the output y is equal to the input x of the previous timestep:

$$y^{<i>}=x^{<i+1>}.$$

For example, first prediction 308 should be close in value to input alert 304.

Figure 4:
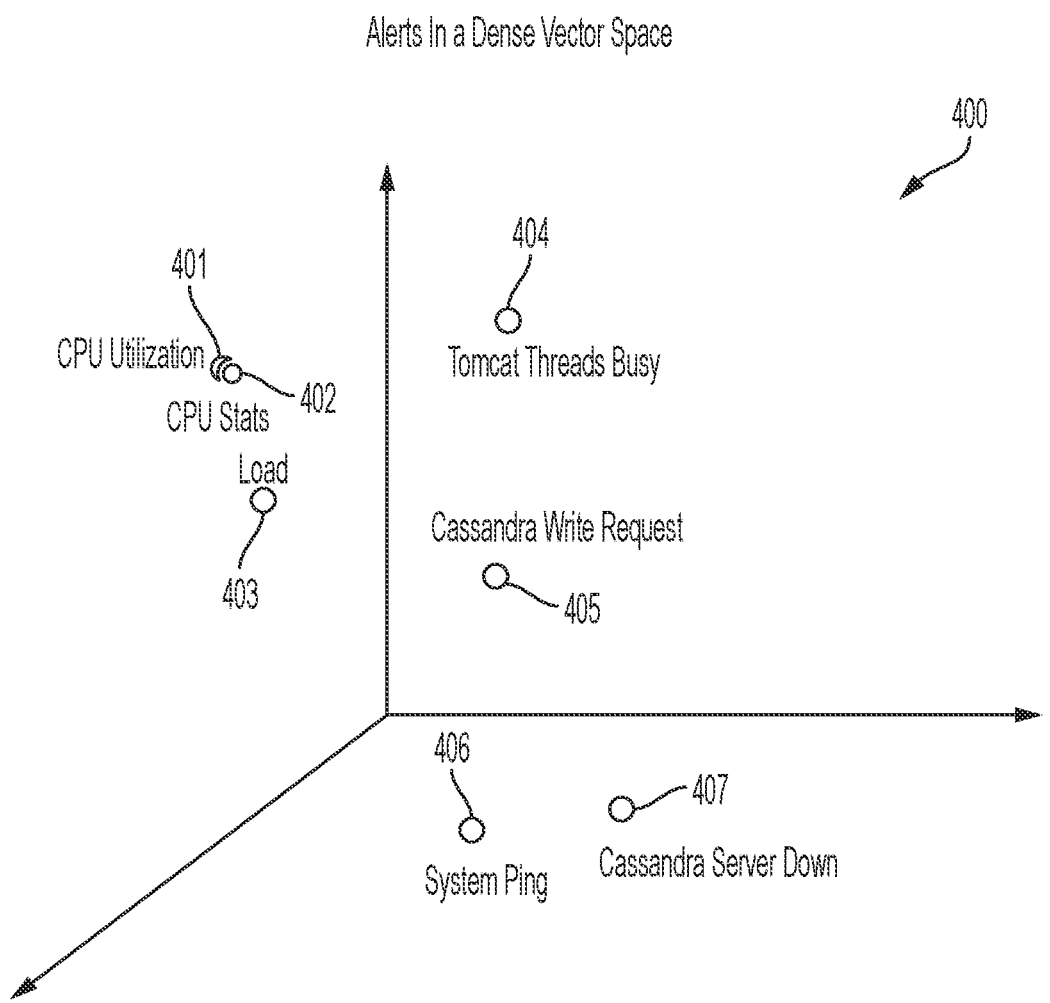
FIG. 4 illustrates learned alert embedding in a dense vector space according to the disclosure.

FIG. 4 illustrates learned alert embedding in a vector space 400 according to the disclosure. The embedding layer in the RNN learns the "alert embedding" using alerts in the training dataset. Once "alert embedding" is learned with the model, every "alert" is represented by a dense vector in a vector space. The position of an alert within the vector space 400 is learned from alert sequences, and based on the alerts that surround the alert when the alert happens. After learned alert embedding, the model understands which alerts have the same meaning, and can be interchanged. The learned alert embedding helps the model generate all possible sequences.

For example, after learning, the model finds that the CPU utilization alert 401 and CPU stats alert 402 are interchangeable. Therefore, both CPU alerts 401, 402 are used when generating a CPU related alert sequence. Load alert 403 is similar to the CPU alerts, consequently the CPU alerts and load alert are located in close proximity in the vector space. System ping alert 406, and Cassandra server down alert 407 are similar, but different than other alerts. Therefore, the system ping alert 406 and Cassandra server down alert 407 are close to each other in the vector space, but far away from other alerts, such as CPU utilization alert 401 and Cassandra write request 405. When generating Cassandra down alerts, for example, a system ping alert 406 might be generated along with Cassandra server down alert 407 due to the close proximity in the vector space, but not with a Tomcat threads busy alert 404.

Figure 5:
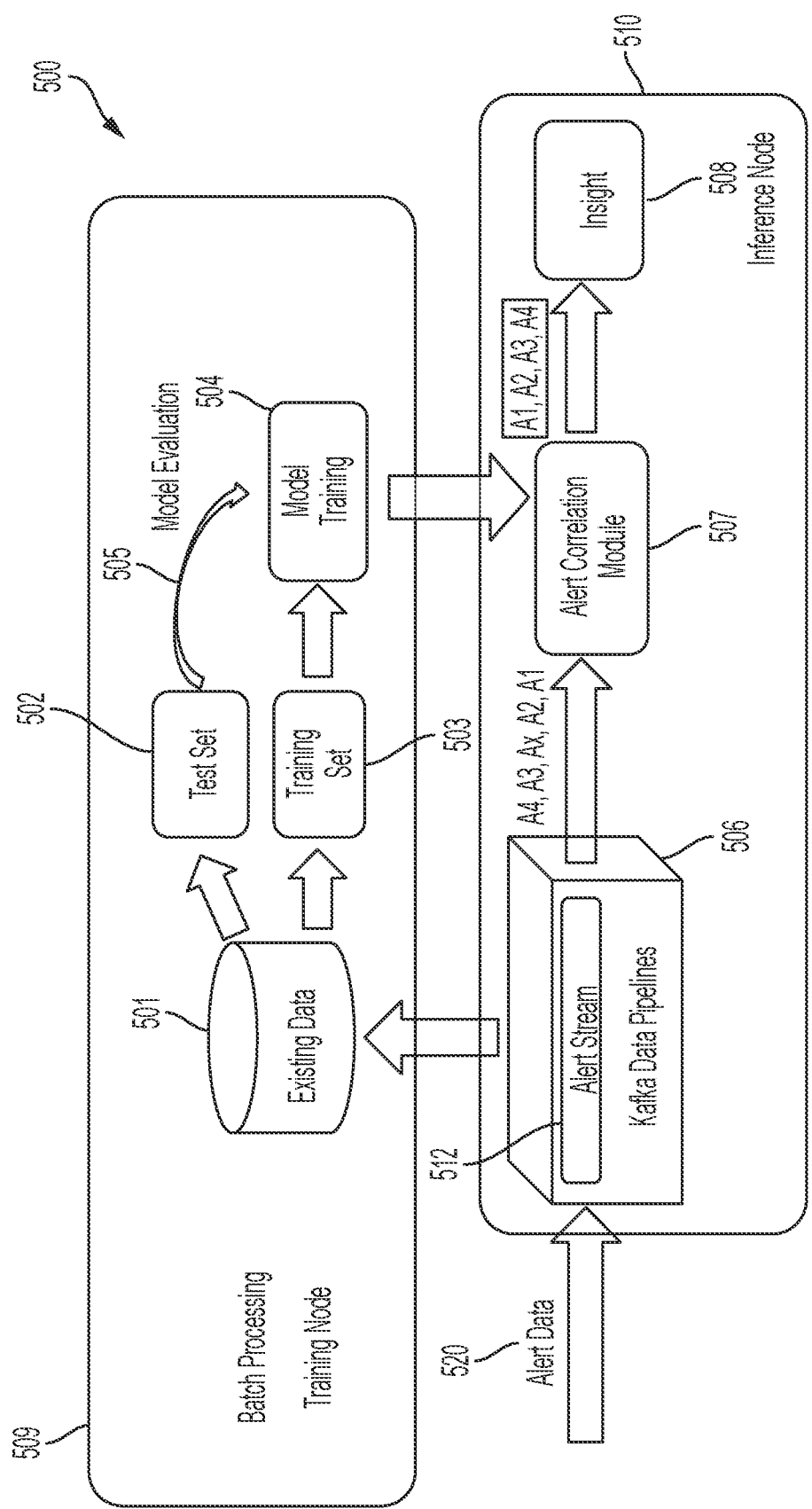
FIG. 5 illustrates an ongoing training workload works alongside the prediction workload according to the disclosure.

FIG. 5 illustrates the training and inference workload processing 500 according to the disclosure. The training workload runs as a scheduled batch job on the batch processing training node 509. The training workload fetches all alerts (e.g., existing data) from the alert repository 501 of existing data, and split the alerts into a training set 503 of alerts and a test set 502 of alerts. The training and inference workload then trains the model 504 on the training set 503 of alerts and tests the model on the test set 502 of alerts. Once the model passes the model evaluation 505, the trained model is published to all inference nodes 510 for alert correlation. Continuous training ensures the model does not drift from the data.

Inference nodes 510 run a real-time processing workload. Alert data 520 from various sources are injected into one or more data pipelines 506 to form alert streams 512. The alert stream 512 passes through the alert correlation module 507, and creates correlated alerts at insight 508. The correlated alerts at insight 508 provide the user insight into the problem experienced in the computing environment. Meanwhile, inference nodes 510 send new alerts into the alert repository 501 for the next retraining job to analyze and create a new pattern from newly received alerts. The training workload can work in parallel with the real-time processing workload to provide a continuous learning and continuous insight into operation of the IT system.

In engaging the systems and methods according to aspects of the disclosed subject matter, a user may engage in one or more use sessions. A use session may include a training session for the user.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as an iPhone®, a tablet, a laptop and the like. In at least some configurations, a user can execute a browser application over a network, such as the internet, to view and interact with digital content, such as screen displays. A display includes, for example, an interface that allows a visual presentation of data from a computing device. Access could be over or partially over other forms of computing and/or communications networks. A user may access a web browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method that may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

As will be appreciated by those skilled in the art, the systems and methods disclosed are configurable to send a variety of messages when alerts are generated. Messages include, for example, SMS and email.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the claims define the scope of the invention and that methods and structures within the scope of these claims and their equivalents be covered thereby.

What is claimed is:

1. A method comprising:
    training, by a system comprising a hardware processor, a sequence model using time sequences of alerts on a recurrent neural network comprising a first long short-term memory layer;
    invoking, by the system, the sequence model based on receipt of a first alert;
    generating, by the sequence model, a first time sequence of alerts comprising the first alert;
    receiving, by the system, a plurality of alerts from one or more applications operating in a network environment comprising computing devices coupled through one or more networks, wherein the plurality of alerts comprise an alert relating to a failure of a computing resource or a program;
    generating a second time sequence of alerts including a subset of the plurality of alerts, the subset of the plurality of alerts excluding at least one alert of the plurality of alerts based on the first time sequence of alerts generated by the sequence model, wherein the generating of the second time sequence of alerts comprises:
        determining that the at least one alert of the plurality of alerts is not included in the first time sequence of alerts generated by the sequence model, and
        excluding the at least one alert from the second time sequence of alerts based on determining that the at least one alert is not included in the first time sequence of alerts generated by the sequence model;
    correlating, by the system, the second time sequence of alerts using topology reinforcement to identify a cluster of related alerts;
    attributing, by the system, the cluster of related alerts to a common triggering event associated with the failure of the computing resource or the program; and
    resolving the failure of the computing resource or the program based on the cluster of related alerts output by the system, the cluster of related alerts providing insight into a root cause of the related alerts, the insight into the root cause used as part of resolving the failure, wherein the recurrent neural network comprises a second long short-term memory layer connected to the first long short-term memory layer, and a dropout layer for regularization, the dropout layer connected to the second long short-term memory layer.

2. The method of claim 1, further comprising:
    converting a raw alert from an application into a normalized alert, the plurality of alerts comprising the normalized alert.

3. The method of claim 1, wherein the topology reinforcement correlates the second time sequence of alerts by connecting alerts from resources of the network environment that are connected to one another, the connected alerts being the related alerts.

4. The method of claim 1, wherein the correlating is further according to similarity reinforcement based on natural language processing of the alerts in the second time sequence of alerts.

5. The method of claim 1, wherein the at least one alert is unrelated to the subset of the plurality of alerts included in the second time sequence of alerts.

6. The method of claim 1, further comprising:
    receiving, by the sequence model, the first alert at a first timestep;
    predicting, by the sequence model, alerts at further timesteps after the first timestep; and
    including, by the sequence model, the predicted alerts in the first time sequence of alerts.

7. The method of claim 6, further comprising:
    performing, by the sequence model, alert embedding comprising representing alerts as vectors in a vector space.

8. The method of claim 7, further comprising:
    using, by the sequence model, proximities of the vectors representing the alerts in the vector space to identify the related alerts.

9. The method of claim 1, wherein the plurality of alerts are not analyzed individually or in alert pairs.

10. A non-transitory computer-readable storage medium storing computer-executable instructions that upon execution cause a computer to:
    train a sequence model using time sequences of alerts on a recurrent neural network comprising a first long short-term memory layer;
    invoke the sequence model based on receipt of a first alert;
    generate, by the sequence model, a first time sequence of alerts comprising the first alert;
    receive a plurality of alerts from one or more applications operating in a network environment comprising computing devices coupled through one or more networks, wherein the plurality of alerts comprise an alert relating to a failure of a computing resource or a program;
    generate a second time sequence of alerts including a subset of the plurality of alerts, the subset of the plurality of alerts excluding at least one alert of the plurality of alerts based on the first time sequence of alerts generated by the sequence model, wherein the generating of the second time sequence of alerts comprises:
        determining that the at least one alert of the plurality of alerts is not included in the first time sequence of alerts generated by the sequence model, and
        excluding the at least one alert from the second time sequence of alerts based on determining that the at least one alert is not included in the first time sequence of alerts generated by the sequence model;
correlate the second time sequence of alerts using topology reinforcement to identify a cluster of related alerts;
attribute the cluster of related alerts to a common triggering event associated with the failure of the computing resource or the program; and
initiate, by the computer, a resolution of the failure of the computing resource or the program based on the cluster of related alerts identified by the computer, the cluster of related alerts providing insight into a root cause of the related alerts, the insight into the root cause used as part of the resolution of the failure, wherein the recurrent neural network comprises a second long short-term memory layer connected to the first long short-term memory layer, and a dropout layer for regularization, the dropout layer connected to the second long short-term memory layer.

11. The non-transitory computer-readable storage medium of claim 10, wherein the computer-executable instructions upon execution cause the computer to:
convert a raw alert from an application into a normalized alert, the plurality of alerts comprising the normalized alert.

12. The non-transitory computer-readable storage medium of claim 10, wherein the topology reinforcement correlates the second time sequence of alerts by connecting alerts from resources of the network environment that are connected to one another, the connected alerts being the related alerts.

13. The non-transitory computer-readable storage medium of claim 10, wherein the correlating is further according to similarity reinforcement based on natural language processing of the alerts in the second time sequence of alerts.

14. The non-transitory computer-readable storage medium of claim 10, wherein the at least one alert is unrelated to the subset of the plurality of alerts included in the second time sequence of alerts.

15. The non-transitory computer-readable storage medium of claim 10, wherein the computer-executable instructions upon execution cause the computer to:
receive, by the sequence model, the first alert at a first timestep;
predict, by the sequence model, alerts at further timesteps after the first timestep; and
include, by the sequence model, the predicted alerts in the first time sequence of alerts.

16. The non-transitory computer-readable storage medium of claim 10, wherein the computer-executable instructions upon execution cause the computer to:
perform, by the sequence model, alert embedding comprising representing alerts as vectors in a vector space.

17. The non-transitory computer-readable storage medium of claim 16, wherein the computer-executable instructions upon execution cause the computer to:
use, by the sequence model, proximities of the vectors representing the alerts in the vector space to identify the related alerts.

18. The non-transitory computer-readable storage medium of claim 10, wherein the plurality of alerts are not analyzed individually or in alert pairs.

19. A system comprising:
a processor; and
a non-transitory storage medium comprising instructions executable on the processor to:
train a sequence model using time sequences of alerts on a recurrent neural network comprising a first long short-term memory layer;
invoke the sequence model based on receipt of a first alert;
generate, with the sequence model, a first time sequence of alerts comprising the first alert;
receive a plurality of alerts from one or more applications operating in a network environment comprising computing devices coupled through one or more networks, wherein the plurality of alerts comprise an alert relating to a failure of a computing resource or a program;
generate a second time sequence of alerts including a subset of the plurality of alerts, the subset of the plurality of alerts excluding at least one alert of the plurality of alerts based on the first time sequence of alerts generated by the sequence model, wherein the generating of the second time sequence of alerts comprises:
determining that the at least one alert of the plurality of alerts is not included in the first time sequence of alerts generated by the sequence model, and
excluding the at least one alert from the second time sequence of alerts based on determining that the at least one alert is not included in the first time sequence of alerts generated by the sequence model;
correlate the second time sequence of alerts using topology reinforcement to identify a cluster of related alerts;
attribute the cluster of related alerts to a common triggering event associated with the failure of the computing resource or the program; and
initiate, by the system, a resolution of the failure of the computing resource or the program based on the cluster of related alerts identified by the system, the cluster of related alerts providing insight into a root cause of the related alerts, the insight into the root cause used as part of the resolution of the failure, wherein the recurrent neural network comprises a second long short-term memory layer connected to the first long short-term memory layer, and a dropout layer for regularization, the dropout layer connected to the second long short-term memory layer.

20. The system of claim 19, wherein the instructions are executable on the processor to:
convert a raw alert received from an application into a normalized alert, the plurality of alerts comprising the normalized alert.

21. The system of claim 19, wherein the topology reinforcement correlates the second time sequence of alerts by connecting alerts from resources of the network environment that are connected to one another, the connected alerts being the related alerts.

22. The system of claim 19, wherein the instructions are executable on the processor to:
perform alert embedding comprising representing alerts as vectors in a vector space.

23. The system of claim 22, wherein the instructions are executable on the processor to:
use, by the sequence model, proximities of the vectors representing the alerts in the vector space to identify the related alerts.

* * * * *